United States Patent [19]

Joyce

[11] 4,108,554
[45] Aug. 22, 1978

[54] Y-JET TIP TESTER

[75] Inventor: William Inglis Joyce, Skelmorlie, Scotland

[73] Assignee: Babcock & Wilcox, Limited, London, Great Britain

[21] Appl. No.: 769,761

[22] Filed: Feb. 17, 1977

[51] Int. Cl.² .................. G01B 11/00; G01B 11/27
[52] U.S. Cl. .................. 356/156; 356/138; 356/241
[58] Field of Search ............... 356/156, 241, 237, 138, 356/140, 141, 153, 172, 152, 167; 250/562, 572, 222 R; 350/81; 209/111.7 R; 408/2

[56] References Cited

U.S. PATENT DOCUMENTS

| 2,146,906 | 2/1939 | Muller | 350/81 |
| 3,495,915 | 2/1970 | Watson et al. | 356/241 |
| 3,636,362 | 1/1972 | Beeman et al. | 356/167 |
| 3,939,386 | 11/1976 | Smith | 356/167 |

OTHER PUBLICATIONS

Habegger, M. A., "Optical Determination of Semiconductor Device Edge Profiles," IBM Tech. Disc. Bull. v. 19, 7-76, pp. 474-477.

Primary Examiner—John K. Corbin
Assistant Examiner—Wm. H. Punter
Attorney, Agent, or Firm—J. M. Maguire; E. A. Steen; R. J. Edwards

[57] ABSTRACT

An apparatus for testing the similarity in cross section and the disposition of each relative to a common axis of a plurality of similar bores formed in a burner tip and distributed around the axis.

6 Claims, 4 Drawing Figures

Y-JET TIP TESTER

BACKGROUND OF THE INVENTION

A widely known form of burner nozzle, through which fuel may be discharged into a furnace chamber, includes a tip having a ring of bores or ports in the form of passages whose axes diverge from a common center. A particular form of such a tip is arranged to operate with a supply of steam to the ports, and a supply of oil into each port from another passageway that opens into the port. A mixture of steam and oil emerges from the ports, and it is essential that, within close tolerances, the ports be similar to each other in cross section and in the inclination of each to the axis of the nozzle. The present invention arose from a consideration of ways in which the similarity of the ports might be tested.

SUMMARY OF THE INVENTION

According to the present invention there is provided apparatus for testing the similarity in cross section and the disposition of each relative to a common axis of a plurality of similar bores formed in a member and distributed around the axis, in which the member is detachably fixed relative to a base, means is fixed relative to the axis and associated with further means such that a beam of radiation may be passed through a bore along a constant path from one of the pair of associated means to the other and an indication produced of the amount of radiation that has passed through the bore, the base and the associated means being rotatable relative to each other about the axis so that each bore may be brought into such orientation relative to the beam that, if its cross section and disposition relative to the axis is similar to that of the first, an equal amount of radiation will pass through the bore. If the member is a burner tip, then, by mounting the tip on the base so that the aforementioned axis is the axis of the tip from which the bores diverge, the similarity of the bores can be readily checked and a tip that does not fall within permitted tolerances can be rejected. It may be that a tip might appear to lie outside the permitted tolerances because swarf or some other loose deposit is lodged within a bore, and this would be checked before the tip is rejected.

DESCRIPTION OF THE PREFERRED EMBODIMENTS

Figure 2:
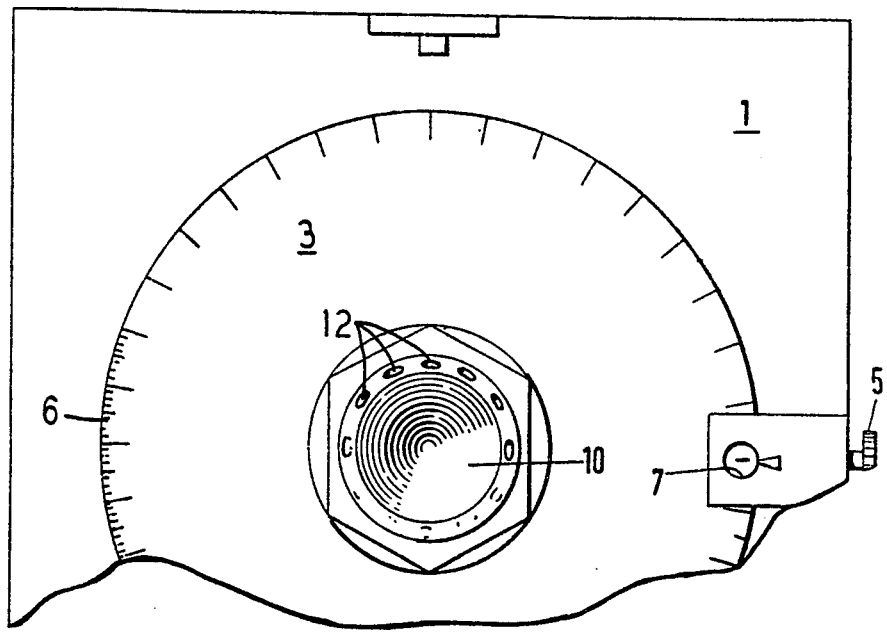
FIG. 2 is a fragmented plan view taken along line II—II of FIG. 1.
Figure 1:
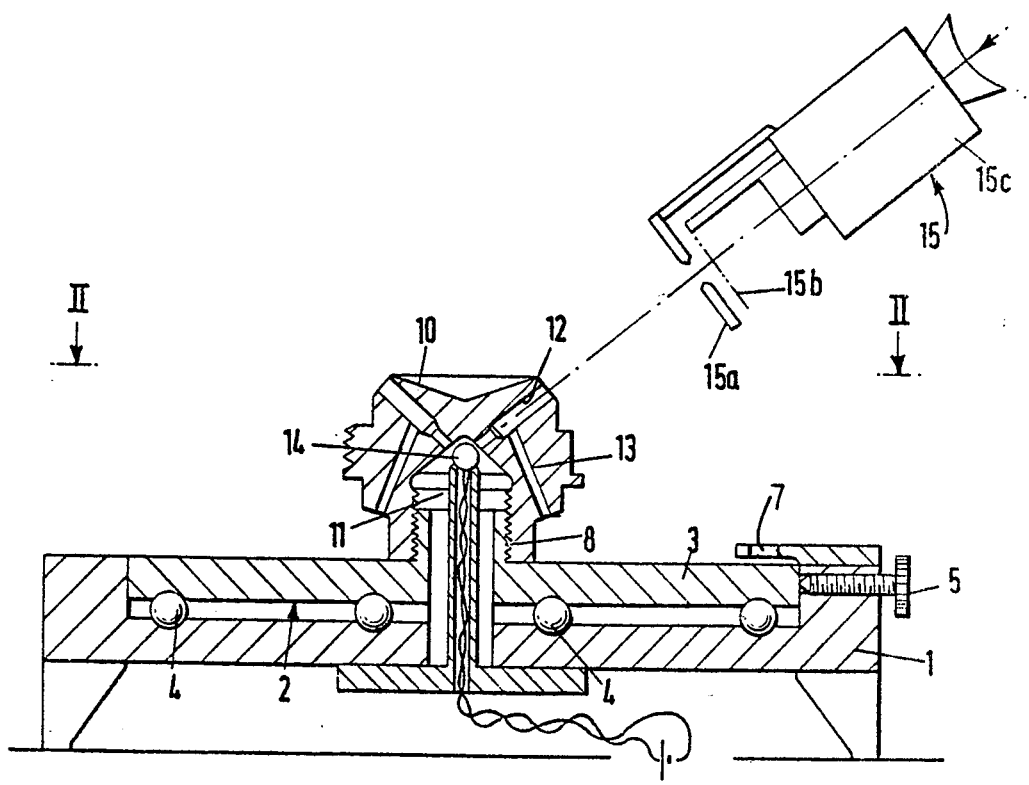
FIG. 1 is a schematic axial section of an apparatus by which the integrity of bores in a burner tip may be tested.

The apparatus shown in FIGS. 1 and 2 includes a support member 1 having a circular recess 2. A circular base plate 3 lies within the recess 2 and is mounted on ball bearings 4 disposed between the base plate 3 and the bottom of the recess 2. The base plate 3 fits closely within the recess so that it can rotate in its own plane about a fixed axis and a thumb screw 5, that penetrates the support member 1, enables the base plate 3 to be fixed in any position to which it is rotated. The rim of the upper face of the base plate 3 is calibrated, at 6, and an index 7, fixed to the support member 1, cooperates with the calibrations to provide the means for determining the angular position of the base plate 3 relative to the support member. An externally threaded bushing 8 is disposed coaxial with the base plate 3 and extends outwardly therefrom to receive a burner tip 10, the latter is formed with a head at its forward end and has a central recess from which fifteen equiangularly spaced and similarly inclined bores 12 diverge from a common center to the outer surface of the head.

The burner tip 10 to be tested in accordance with the present invention is of the character which is normally used to introduce a finely atomized oil spray for firing in a furnace and wherein atomizing steam is supplied through a duct which is screwed into the recess 11 and fuel oil is supplied through an annular duct surrounding the steam duct and communicating with each of the bores 12 through corresponding bores 13.

Referring to the embodiment shown in FIGS. 1 and 2, a light source 14 is fixedly disposed relative to the support member 1 so that its center is at the common center of the bores 12. A device 15, which is responsive to the radiation emitted by the light source 14, is fixedly disposed relative to the support member 1 and externally of the burner tip 10. The responsive device 15 includes a collimating aperture 15a, in the form of an iris diaphragm, a translucent screen 15b and a receiver 15c arranged to produce a response dependent upon the amount of radiation that falls on it. The receiver 15c may be a photoelectric cell or, more elaborately, a narrow angle spot measuring light meter.

The integrity of the bores 12 in the burner tip 10, i.e., the cross section and the inclination of the bores 12 relative to the common axis about which the base plate 3 rotates, is tested by rotating the base plate 3 to align one of the bores 12 with the beam of light that passes from the lamp or light source 14 to the receiver 15c. The base plate is then rotated through 24 degrees so that the next bore, if properly separated from the first, comes into alignment with the beam. If the response in the receiver for the second bore is within a permitted tolerance of that for the first bore, then their integrities are acceptably nearly the same. If not, and the explanation does not lie in removable swarf or dirt within the bore, then the burner tip 10 must be rejected. In the embodiment of FIGS. 1 and 2, the description relates to a burner tip having fifteen bores, however, it will be recognized that the testing apparatus is applicable to burner tips having a greater or lesser number of bores and that the degrees of rotation required of the base plate between adjacent bores is dependent on the number of bores provided for the burner tip being tested.

It will be further recognized that the lamp 14 need not be on the axis of rotation of the burner tip 10, in that, since it is fixed relative to the axis of rotation of the burner tip 10, it will always bear the same relationship to each of the bores 12, if each of those bores bears the same relationship to the axis of rotation. If, however, the axis of rotation of the burner tip 10 is not coincident with the axis of the burner tip 10, i.e. the axis about which the bores 12 are supposed to be symmetrical, then unreliable results will be obtained.

Figure 3:
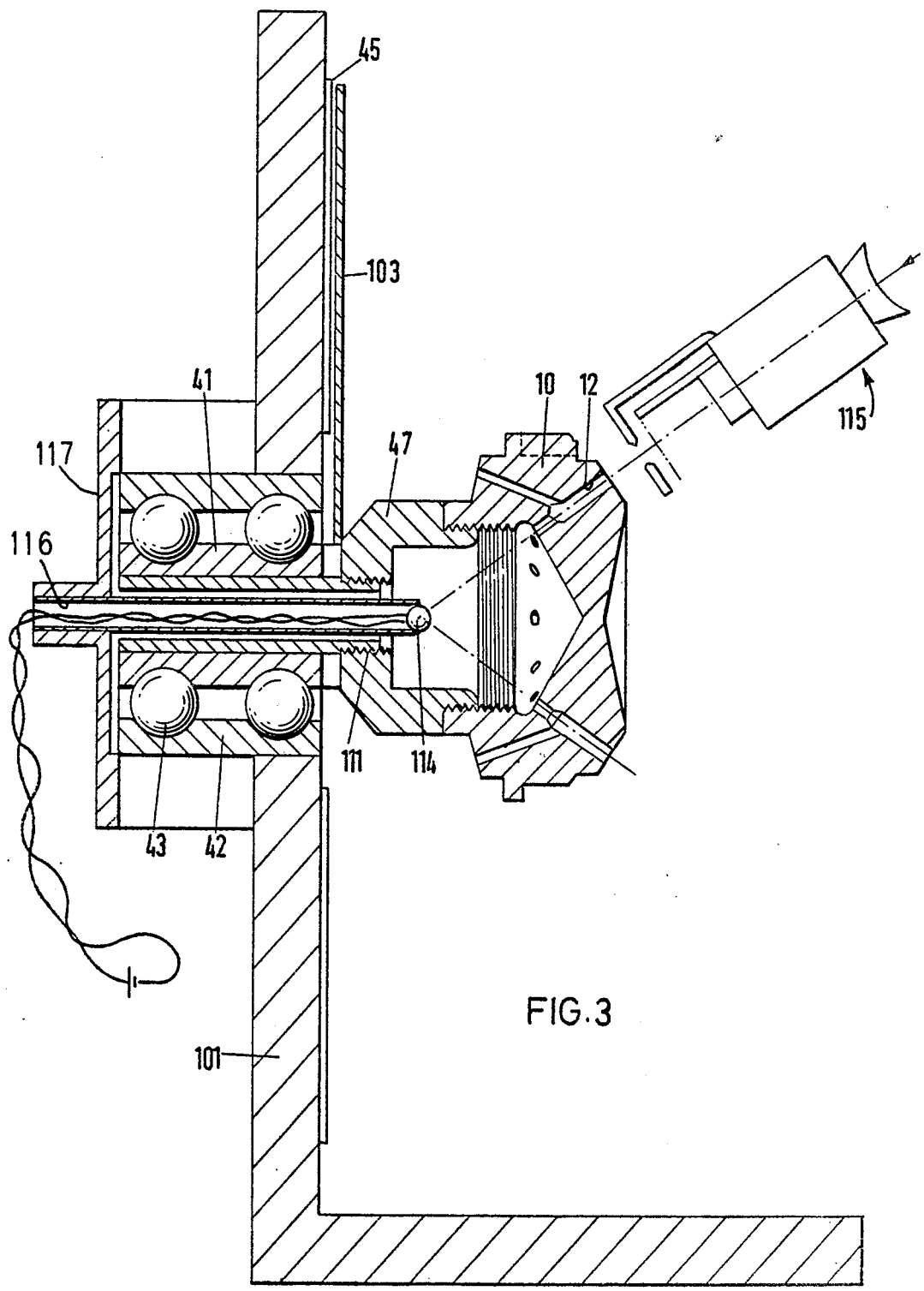
FIG. 3 is a schematic axial section of an alternate embodiment of the apparatus shown in FIG. 1.

Referring to the embodiment shown at FIG. 3, the burner tip 10 is carried by a bushing 111 which is formed as a threaded end portion of a sleeve 41. The sleeve 41 is rotatable within a race 42 which is fixed to the support member 101. A plurality of ball bearings 43 are interposed between the race 42 and the sleeve 41. In this embodiment, the base plate 3, shown in FIGS. 1 and 2, is replaced by a pointer 103 which moves over a circular scale 45 fixed to the support member 101.

The burner tip 10 is connected to the bushing 111 by means of an adapter 47, and through the suitable choice of an adapter, a variety of different burner tips can be tested on the same apparatus. In order to accommodate the use of different adaptors, means must be provided to allow for relative adjustments of the lamp 114 with respect to the radiation receiving device 115. The adjustment means may be comprised of a stem 116 which carries the lamp 114 and is reciprocable parallel to the axis and provided with means, not shown, to retain it in any position to which it is adjusted. Adjustment may also be effected, for instance, by a screw engagement, not shown, of the stem 116 with the plate 117. Means, not shown, may also be provided for adjusting the axis of the receiving device 115 so that it can be aligned with bores of different inclinations.

Figure 4:
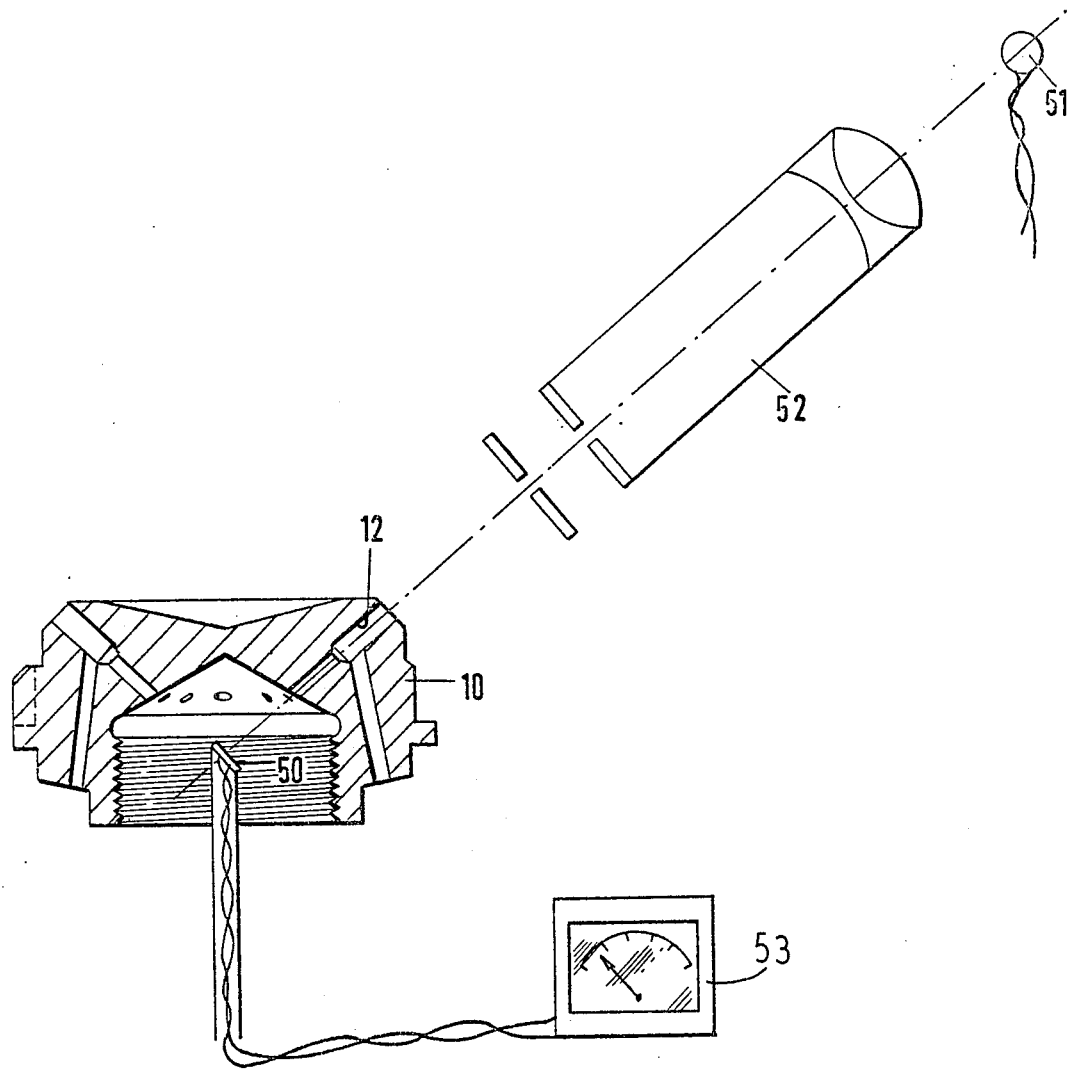
FIG. 4 is a schematic axial section of another alternate embodiment of the apparatus shown in FIG. 1.

Referring to the embodiment shown at FIG. 4, a light source 51 lies outside of the burner tip 10 and a receiving screen 50 is positioned within the burner tip 10. A collimator 52 is arranged to direct radiation from the source 51 through the bore 12 and onto the screen 50. A light meter 53 measures the radiation received by the screen.

While in accordance with the provisions of the statutes, there is ilustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows:

1. An apparatus for testing a plurality of similar bores of a fluid fuel burner tip to determine the similarity in cross section and the disposition of each bore relative to the central axis of the burner tip, a recess formed in the burner tip, the bores diverging from the recess, a member threadably engaged with the burner tip, means fixed relative to the central axis, means associated with the first named means such that a beam of radiation may be passed through one of the bores along a constant path from one to the other of the associated means, means for indicating the amount of radiation that has passed through the bore, the member and one of the associated means being rotatable relative to each other about the central axis so that each bore may be brought into such orientation relative to the beam that an equal amount of radiation will pass through the bore if its cross section and disposition relative to the central axis is similar to that of the first bore.

2. The apparatus according to claim 1 wherein said member includes a rotatable circular base plate.

3. The apparatus according to claim 2 wherein said base plate is circumferentially calibrated.

4. The apparatus according to claim 3 including a fixed member supporting the base plate, the fixed member having an index co-operating with the base plate calibrations for determining the angular position of the base plate relative to said fixed member.

5. The apparatus according to claim 1 wherein said member is an adapter.

6. The apparatus according to claim 5 including a rotatable bushing threadably engaged with said adapter.

* * * * *